(12) United States Patent
Ghosh et al.

(10) Patent No.: US 10,567,972 B2
(45) Date of Patent: Feb. 18, 2020

(54) CLOUD-BASED SYSTEM FOR DISTRIBUTED HIERARCHICAL DATABASES

(71) Applicant: Nokia Technologies Oy, Espoo (FI)

(72) Inventors: Chittabrata Ghosh, Fremont, CA (US); Dinesh Datla, Lynchburg, VA (US)

(73) Assignee: Nokia Technologies Oy, Espoo (FI)

( * ) Notice: Subject to any disclaimer, the term of this patent is extended or adjusted under 35 U.S.C. 154(b) by 180 days.

(21) Appl. No.: 15/319,991

(22) PCT Filed: Jun. 27, 2014

(86) PCT No.: PCT/US2014/044695
§ 371 (c)(1),
(2) Date: Dec. 19, 2016

(87) PCT Pub. No.: WO2015/199732
PCT Pub. Date: Dec. 30, 2015

(65) Prior Publication Data
US 2017/0134961 A1     May 11, 2017

(51) Int. Cl.
*H04W 16/14*     (2009.01)
*H04W 48/02*     (2009.01)
*H04L 29/08*     (2006.01)

(52) U.S. Cl.
CPC ......... *H04W 16/14* (2013.01); *H04L 67/1097* (2013.01); *H04W 48/02* (2013.01)

(58) Field of Classification Search
CPC .............................. H04W 16/14; H04W 48/02
USPC ........................................................ 370/328
See application file for complete search history.

(56) References Cited

U.S. PATENT DOCUMENTS

| 8,224,257 B2 | 7/2012 | Reunamaki et al. |
| 8,768,371 B2* | 7/2014 | Chaudhri ............ H04W 72/082 370/329 |
| 8,989,021 B2* | 3/2015 | Simon ..................... H04W 4/06 370/241 |

(Continued)

FOREIGN PATENT DOCUMENTS

WO     2014078676 A2     5/2014

OTHER PUBLICATIONS

International Search Report and Written Opinion received for corresponding Patent Cooperation Treaty Application No. PCT/US2014/044695 dated Apr. 23, 2015 in 9 pages.

*Primary Examiner* — Angel T Brockman
(74) *Attorney, Agent, or Firm* — Mintz Levin Cohn Ferris Glovsky and Popeo, P.C.

(57) ABSTRACT

In some example embodiments, there may be provided a method, which may include receiving, by a first cloud node, spectrum information collected by a sensor, wherein the spectrum information includes radar information and possible interferer information, wherein the radar information includes at least one of a physical location of a radar, a location of the radar main beam, a frequency of a radar, or a rotation pattern of the radar; uploading, by the first cloud node, at least a portion of the collected spectrum information to a database shared by at least a second cloud node; and sending, by the first cloud node, a command to use or inhibit use of a portion of the spectrum allowed to be shared between at least a radar and a user equipment. Related systems, methods, and articles of manufacture are also disclosed.

21 Claims, 4 Drawing Sheets

(56) References Cited

U.S. PATENT DOCUMENTS

| | | | |
|---|---|---|---|
| 2005/0215266 A1 | 9/2005 | Tsien et al. | |
| 2006/0083205 A1* | 4/2006 | Buddhikot | H04W 16/14 370/338 |
| 2012/0032833 A1* | 2/2012 | Milligan | G01S 7/006 342/59 |
| 2012/0120887 A1* | 5/2012 | Deaton | H04W 16/14 370/329 |
| 2014/0247785 A1* | 9/2014 | Liu | H04W 72/0453 370/329 |
| 2016/0094998 A1* | 3/2016 | Bhushan | H04W 16/14 455/454 |

* cited by examiner

CLOUD NODE 200

CLOUD-BASED SYSTEM FOR DISTRIBUTED HIERARCHICAL DATABASES

RELATED APPLICATION

This application was originally filed as Patent Cooperation Treaty Application No. PCT/US 2014/044695 filed Jun. 27, 2014.

FIELD

The subject matter described herein relates to wireless.

BACKGROUND

In some jurisdictions around the world, commercial communications, such as cellular, wireless local area networks, and other commercial radios, and radars are not allowed to co-exist and thus share the same portions of the spectrum due to regulatory restrictions. In the United States however, a recent Presidential Council of Advisory for Science and Technology (PCAST) report indicates that some military bands, such as S-band which was previously exclusive to radars and other military and governmental uses, will be released for limited secondary uses, such as commercial/consumer communications including for example commercial radios.

SUMMARY

Methods and apparatus, including computer program products, are provided for a cloud-based framework for spectrum sharing.

In some example embodiments, there may be provided a method, which may include receiving, by a first cloud node, spectrum information collected by a sensor, wherein the spectrum information includes radar information and possible interferer information, wherein the radar information includes at least one of a physical location of a radar, a location of the radar main beam, a frequency of a radar, or a rotation pattern of the radar; uploading, by the first cloud node, at least a portion of the collected spectrum information to a database shared by at least a second cloud node; and sending, by the first cloud node, a command to use or inhibit use of a portion of the spectrum allowed to be shared between at least a radar and a user equipment.

In some variations, one or more of the features disclosed herein including the following features can optionally be included in any feasible combination. The command to inhibit the portion of the shared spectrum may include a channel switch command to trigger a channel switch from the portion to another portion of the spectrum. The command to inhibit the portion of the shared spectrum may include a turn off command causing one or more commercial radios to stop transmitting on the portion of the shared spectrum. The first cloud node may be coupled to at least one of a shared spectrum access database at a first tier or a licensed shared access controller at a second tier. A base station may include the sensor collecting the spectrum information. The database may include an internet protocol cloud database. The first cloud node and the second cloud node may share a common cloud database framework having a plurality of configurable functions. The configurable functions may include at least one of a sensor, a service discoverer, a radio resource manager, a database synchronizer, a service request queue, a radio resource manager, a service registry, or a resource provisioner. A security interface, at the first cloud node, may be configured to restrict access at the radar information by other cloud nodes. The possible interferer information may include at least one of a frequency of a radio transmitter, a location of a radio transmitter, or a time associated with a transmission at the frequency and the location. The first cloud node may include a distributed node connected to a cloud network.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
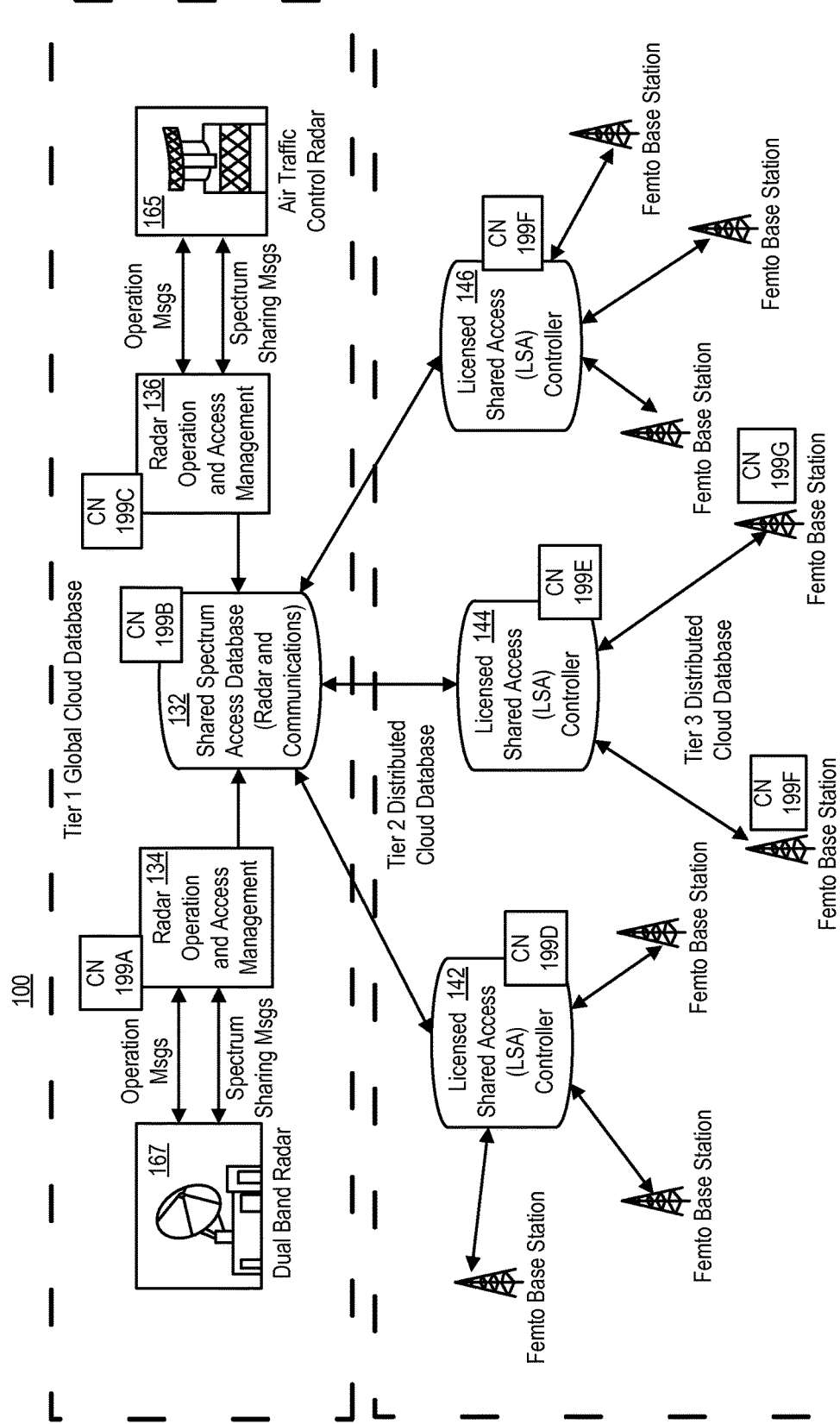
FIG. 1 depicts an example multi-tier hierarchy system, in accordance with some example embodiments.

Like labels are used to refer to same or similar items in the drawings.

DETAILED DESCRIPTION

Although spectrum sharing among commercial communications and government reserved bands, such as those reserved for radars, may be possible, there will likely be a complex hierarchy of controls placed on the sharing of the spectrum. The complexity is due in part due to the various organizations each having different roles in the spectrum to be shared. Moreover, the complexity is compounded by the sensitive and confidential nature of some radar systems. This complexity makes implementation of a system of databases a challenge due to the inherent latency associated with the complex hierarchy of organizations. However, the dynamic nature of radar information, such as location of the main lobe beam, times of use, frequency of use, and the like, may make excessive latency impractical if not intolerable.

In some example embodiments, the subject matter disclosed herein may provide a cloud-based network that couples the entities involved in spectrum sharing. In particular, there may be provided a common cloud node to enable spectrum sharing.

Although some of the examples discloses herein refer to spectrum sharing among commercial radios and radars, the subject matter discloses herein may be used in other spectrum sharing frameworks as well.

FIG. 1 depicts an example system 100 in which spectrum sharing can be provided, in accordance with some example embodiments. The system includes a hierarchy of tiers, such as tiers one-three. The tiers may each have different privileges with respect to reading and/or writing spectrum sharing information, such as radar information (for example, frequency being used by a radar, time of use, and the like), on a cloud based network comprising cloud nodes 199A-199F coupled via a network, such as the Internet and/or other types of networks. Each node may be connected to a database having the spectrum sharing information.

Although FIG. 1 depicts three tiers, other tiers and arrangements may be used as well.

In the three-tiered system of FIG. 1, the first tier may include a Shared Spectrum Access Database, SSAD 132, which couples to one or more systems, such as radar operations and access management systems 134-136, where information about a radar may be obtained or provided. FIG. 1 also shows Licensed Shared Access (LSA) controllers 142-144 that are authorized to couple to the SSAD 132 to obtain certain information regarding radars 165 and 167. Tier three includes network controllers, such as base stations and wireless access points that obtain information from for example the LSA controller regarding allocated frequencies and time during which a portion of the spectrum (typically reserved for a radar) can be allocated to commercial use for a certain period of time.

As shown in FIG. 1, SSAD 132 may obtain radar information for radars 165 and 167 via access nodes 134 and 136. The collected radar information may include a radar's precise location, a location of a main beam of the radar, a pattern of the radar, a rotation pattern of the main beam of the radar, effective radiated power of the radar, a center frequency of the radar, modulation used by the radar, a bandwidth of the radar, side lobe information of the radar, and the like. However, some of the operating details of a radar may be considered sensitive if not highly confidential. Access controls may be implemented to limit which details of a given radar are shared with tier 2 and/or 3 entities including communication systems, such as LTE networks, W-iFi networks, and the like. Given the sensitive nature of some of the radar information, the radar, such as radar 165 and 167, may share radar information only with certain authenticated nodes and may share only certain types of information limited to a specific band, such as S-band (2-4 GHz). For example, access node 134 may collect and forward radar information for radar 167 to SSAD 132. The SSAD 132 may then grant limited access to certain information about radar 167 to certain authenticated nodes, which in the example of FIG. 1 is referred to as an Licensed Shared Access (LSA) controller 142-146 (which may include a database as well).

FIG. 1 also shows the deployment of cloud node (CN) 199A-G, in accordance with some example embodiments. The cloud nodes may be deployed to provide a cloud-based framework at the tiers of FIG. 1. As such, the cloud nodes may provide a cloud-based system to provide co-existence among radars and networks, such as cellular, LTE, W-iFi, and the like. Moreover, the cloud-based system and, in particular, the hierarchical structure of cloud nodes distributed throughout system 100 may facilitate the co-existence and thus spectrum sharing, in accordance with some example embodiments. For example, the cloud nodes may be configured to control access to spectrum sharing information (for example, details regarding a radar), and this access control may be dependent on the hierarchy, so that access to sensitive radar information from the first tier is controlled when sharing is performed with other cloud nodes at the second and third tiers.

The cloud nodes of the first tier may be administered by for example a regulatory policy maker and other entities that have un-restricted read-write access to the respective first tier cloud nodes and the corresponding radar information. In the case of the second and third, the cloud nodes in those tiers may be configured to have restrictions, such read access to only certain radar information. Moreover, the restrictions may be regulated by a cloud node (or entity) at the first tier or a node (or entity) in an intermediate tier. In some example embodiments, the cloud nodes are common to all of the tiers and form a cloud network to enable the spectrum sharing.

Unlike the TV white spaces where database access has been mandated in some jurisdictions (for example, the US FCC requires checking the database once every 24 hours), radar operation may change quite frequently (for example, in about 100-500 milliseconds). This rapid and dynamic change with respect to a radar's spectrum occupancy may require radar information to be shared in the system of FIG. 1 with little (or minimal) latency for reduced interference to sensitive radar detection. As such, the cloud-based system including the cloud nodes disclosed herein may enable sharing radar information for co-existence in a secure, controlled, and low latency manner.

The SSAD 132 may be considered a so-called "global" cloud database, in the sense that it is a centralized location for radar system information, such as military and government radars. In the second tier, distributed cloud databases comprising Licensed Shared Access (LSA) controllers 142-146 may be configured as well. While in the third tier, users with distributed databases having general authorized access, such as LTE eNBs of small cells, APs of Wi-Fi networks, are configured. The second tier LSA may provide to a third tier network information about a channel allocation and a duration for use of the allocated channel.

In the example of FIG. 1, the SSAD 132, LSA 142-146, and tier three nodes each include a cloud node, in accordance with some example embodiments. Although the cloud nodes are common, each cloud node may be configured to provide different access, read, and/or write privileges based on the cloud nodes location in the multi-tier framework 100.

As shown at FIG. 1, cloud nodes may be configured in each tier of the hierarchy. In a given geographical region, there may be one or more "Regional Spectrum Sharing Decision-Maker & Occupancy Information" databases, each of which may be administered by a respective cellular service provider. The dynamically configurable networking elements (such as configurable routers) can be used to connect the distributed cloud nodes in each of the tiers. The networking elements may be managed and configured with customized routing and information sharing policies from a Centralized Network Management module. This may be implemented via software-defined networking (SDN) in the proposed three-tier cloud network.

Figure 2:
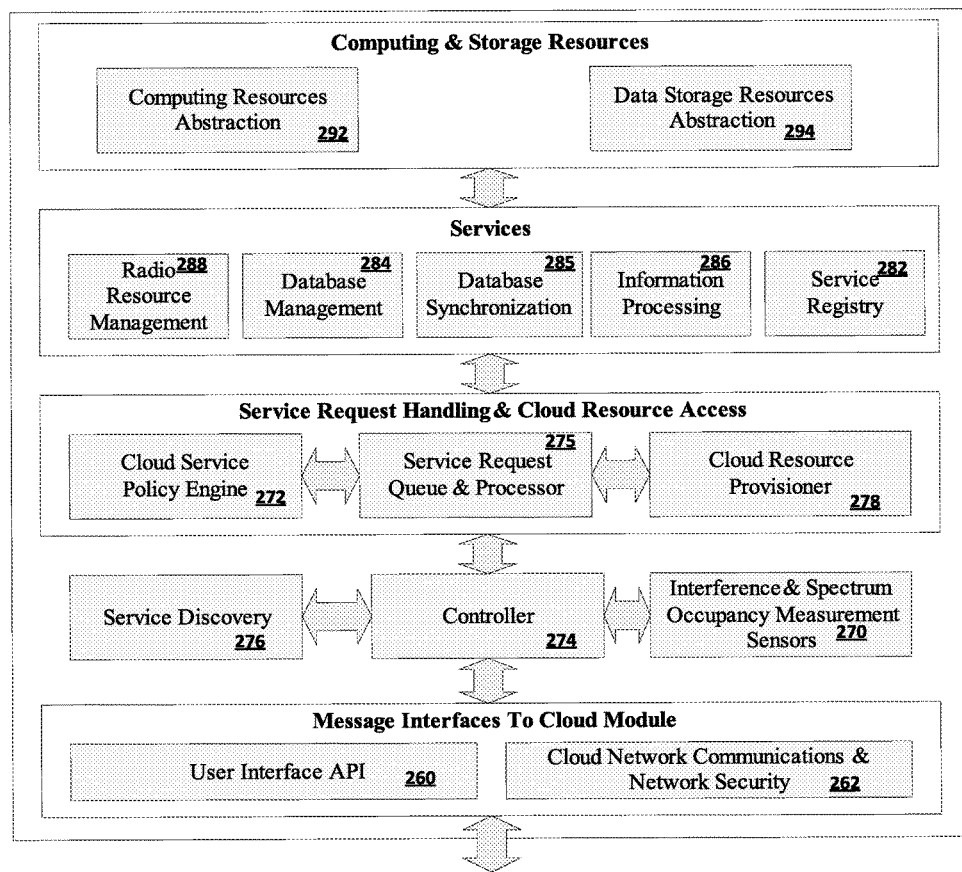
FIG. 2 depicts an example cloud node, in accordance with some example embodiments.

FIG. 2 depicts an example of a common cloud node 200, which may be used at cloud nodes 199A-F of the multi-tier cloud network, in accordance with some example embodiments.

The cloud node 200 may provide a collaborative vendor-agnostic implementation of a cloud node, wherein individual services can be incorporated by different vendors.

Although FIG. 2 depicts a plurality of functionality, a given cloud node may not include some of the component functionality shown. Moreover, a functional component may be implemented in each of the three tiers of the multi-tier cloud network of FIG. 1, but with different configurations, such as different access rights at each level of the three tiers (for example, what types of access to radar information may change at each level of the tiers). To illustrate further, the Interference and Spectrum Occupancy Measurement Sensors component 270 may not be included (or for example configured or activated) in a first tier cloud node as component 270's purpose is inapposite at the first tier (for example component 270 seeks to detect the presence of commercial communications which can be found at the second and third tiers while the first tier relates to radars, military communications, and their corresponding radar or communication information).

In some example embodiments, cloud nodes 199A-F may be implemented at various components in system 100 to provide an interface to the cloud (for example, user interfaces and program interfaces), centralized control of the cloud node and the functionality therein, service request processing, managing cloud resources (for example, storage, processing, and the like), executing specific services available at the cloud node, and generate an abstraction of the overall cloud's computing and/or storage resources.

The cloud node 200 may include a user interface application program interface (API) 260. This API 260 may provide and/or generate one or more user interfaces. The user interfaces may be used at the different tiers of system 100 (FIG. 1). Moreover, the user interfaces may be configured specifically for each tier. For example, the user interfaces may be configured based on whether the user interface is being used at SSAD 132 at the first tier, the LSA 142 at the second tier, and/or a base station at the third tier. Regardless of the tier, the user interface provide access to the cloud node (and its functions therein) and the interconnected cloud. Moreover, the user interface may also provide access to a so-called "regional" User Spectrum Occupancy Information Database (which may be provided by a database at for example an LSA (in the second tier) and/or a given wireless network of the third tier.

The cloud node 200 may also include a Cloud Network Communications and Network Security 262 component. This component 262 may implement network communication with other cloud components, such as other cloud nodes, databases, devices, and the like, using networking protocols. Moreover, communications and network security component 262 may provide a security layer through which interactions/communications with other cloud nodes, devices, and/or other computing/storage resources take place. For example, the security layer may authenticate messages (for example, service discovery messages, database delta records, and service requests, and the like) received from other cloud nodes, devices, and/or the like. This security layer may also enable screening and blocking to ensure that tier two and three cloud nodes (for example, at an LSA or an LTE base station) do not access sensitive or classified radar information without authentication. In some example embodiments, security module 262 may be configured to restrict access to the exact location of a radar main beam at any instant of time; frequency of radar operation; and/or rotation pattern of the radar main beam. For example, a first tier database may have the exact location (i.e., very precise location of a radar) and frequency of a radar, but provide more general, estimates of radar location and frequency to a second tier LSA and/or third tier network. Sensors in the second or third tiers may use the estimates in order to detect more specific radar information. For example, the radar beam may be within any location of zero to thirty degrees with respect to the location registered by LTE networks of an LSA network. However, to gauge the exact location within 0-30 degrees, sensors at the second or third tier may detect the radar beam and signal power.

Moreover, security module 262 may be configured to enable the Cloud Service Policy Engine 272 to turn off (administer and secure from a tier 1 device, such as cloud node 199A-C) a Tier-2 or Tier-3 device that is causing impermissible interference to a radar. Interference to a radar can be created by one or more cellular cells (for example, base stations transmitting on a frequency being used by a radar), and this interference may cause a severe interference event at the radar (which may lead to false alarms, misdetection, and other failure modes). For example, security module 272 at for example cloud node 199B may thus send a message to Cloud Service Policy Engine 272 to trigger a channel switch to a Tier-2 or Tier-3 device in order to stop the interference. When the security module 262 turns off a Tier-2 device (for example, LSA 144), the security module turns off all the LTE networks served by that LSA, so that the shared spectrum cannot be used for a given time period. When the security module 262 turns off a Tier-3 user, the security module turns off a specific LTE network (for example, a small cell or a macro cell).

Regarding channel switching, security module 262 may advise or initiate a channel switch as noted. When this is the case, the channel switch may indicate available channel(s) where the radar is not currently active. For example, sensors 270 may detect the radars at a first channel but not at a second channel. In this example, security module 262 may advise a switch from the first channel to the second channel.

The cloud node 200 may include a controller 274. Controller 274 may route inbound network messages to appropriate components in cloud node 200. Controller 274 may also build network messages that have to be sent out of the cloud node 200 to the network, other cloud nodes, and/or devices. Moreover, controller 274 may execute a startup procedure for the cloud node to initialize cloud node 200, activate some (if not all) of the functions therein, and connections to the network/cloud. The controller 274 may be configured to assign privileges with respect to read, write, and other radar information access privileges. The controller 274 may also execute background procedures for the cloud node, such as service discovery 276.

The cloud node 200 may also include a Service Discovery 276 element. Service Discovery 276 may enable each cloud node in the cloud to obtain knowledge regarding the location of neighbor cloud nodes, information regarding spectrum availability, radar information, and/or computing services in other cloud nodes. Service discovery may be performed by each cloud node from time to time.

The cloud node 200 may also include a Service Registry 282. Service Registry 200 may provide information on services that are gathered (via for example Service Discovery 276) and stored in the cloud node's internal service registry.

The cloud node 200 may also include an Interference and Spectrum Occupancy Measurement Sensors 270 (also referred to as sensors). Sensors 270 may be used to detect the presence of commercial signals at certain channels which are candidates for co-existence with radars. For example, sensor 270 may detect the presence of a cellular signal, a Wi-Fi access point signal, and the like. In some example embodiments, a radar, such as radar 167, may implement a spectrum block to reserve a portion of the spectrum. When this is the case, sensor 270 may be used to detect the presence of commercial communications signals that are not expected due to the block to operate at specified times, geographical locations, power levels, and frequencies.

Sensors 270 may collect spectrum occupancy information from respective databases, such as SSADs and LSAs. Sensors 270 may also be used for spectrum sensing by existing radars or commercial networks before accessing the spectrum to detect the use of a portion of the spectrum. For example, if radar 167 seeks to operate on a certain frequency, cloud node 199A may access a sensor 270 to determine whether a given portion of the spectrum being shared with commercial wireless is being used. If unused, the open channel can be used by the radar or pooled for use by other devices.

Sensors 270 may be implemented in a variety of ways. For example, some of the sensors may be installed by a network service provider, while other sensors may be part of Internet of Thing's low power sensor network. For example, the sensors 270 may collect information regarding radar main beam location and frequency of radar operation and upload sensed data to a cloud database 284 shared by Interference and Spectrum Occupancy Measurement Sensors 270 at other cloud nodes.

Cloud Service Policy Engine 272 may be responsible for imposing policies that regulate access to cloud node 200's resources, which may be requested via a service request. For example, a service request from a Tier-2 or Tier-3 cloud node may not have write or modify privilege at a Tier 1 cloud node.

Cloud Resource Provisioner 278 may monitor cloud resources and provision the resources for processing service requests. Provisioner 278 may internally manage computing resources, and may assign and schedule computing resources to various computing operations involved in processing service requests. Resources may be provisioned by for example an LSA to multiple LTE base stations (labeled eNBs, evolved Node B base stations) based on optimization objectives, such as minimization of computational latency and maximization of resource utilization. Provisioner 278 may work in synchronization with Computing and Storage Resources components 292-294.

Service Request Queue & Processor 275 may provide a service request queue. For example, a service request may be placed in a queue for processing. Queuing of service request messages may facilitate efficient handling of service requests (for example, serialization, and prioritization). When a service request arrives that relates to a database synchronization of a radar user's data, this service request may be handled with a high priority. The high priority may enable radar information related service requests to be use a priority queue with pre-emptive servicing. Priority to service requests may also be based on the tier to which the cloud node belongs.

To illustrate with an example, when it is the turn of a service request in the queue to be processed, the service request may be filtered through a policy engine. Next, Cloud Resource Provisioner 278 may be consulted for optimized processing of the service request. In this manner, component 275 may control all access (usage of resources and add, delete, modify) to the cloud node's computing and information resources. Database synchronization and any database re-indexing operations may also require processor resources and, hence, have to pass through the service queue like any other service request.

By way of another example, cloud node 199F (which is at a third tier base station) may send a service request to another cloud node, such as cloud node 199E at an LSA (which is at the second tier). This service request may request a list of usable frequencies in the shared spectrum with one or more radars. The service request may also specify a time, a quality of service requirement, and the like. When the cloud node 199E receives the service request, it may queue the service request, as noted above, before it invokes the Radio Resource Management module. In response, cloud node 199E may send a message including the allowed one or more frequencies in the co-existence spectrum with the radars. When cloud node 199F receives the allocation, the base station associated with cloud node 199F may then allocate a radio resource to a user equipment, such as a smart phone or cell phone.

Database Management 284 may include a database and may implement one or more algorithms to rapidly search through a database for a queried record, to re-organize/re-index records in a database upon a change in the database, and/or provide reliable and secure interfaces to read, write, and modify records in the database. The database may be implemented as a structured database including a database management system. The database may also comprise a cloud database shared among a plurality of cloud nodes.

Table 1 below lists examples of the different types of information handled by the cloud. The database manager 284 may, as noted, store the types of data (as well as other types) listed in Table 1. The information stored at the cloud node 200 via the database manager 284 may be shared (with read, write, and modify restrictions based on tier and type of information).

TABLE 1

| Type of information | Information Source | Cloud Modules Interested in Information |
| --- | --- | --- |
| Spectrum occupancy of incumbent users | Incumbent user (e.g., radar) occupancy database - potential spectrum occupancy information is entered into the database by incumbent users | All tier-2 and tier-3 Regional Spectrum Sharing Decision-Maker & Occupancy Information Database modules |
| Spectrum occupancy of tier-2 and tier-3 users, including frequency, bandwidth of LTE networks and range of frequencies, beam locations within a scan sector of radars Policy and regulatory information - such as spectral masks and the like Interference measurements Spectrum occupancy measurements | | Other tier - 2 cloud modules |

Cloud node 200 may also include an Information Processing module 286. This information processor 286 may implement one or more algorithms to process information retrieved from a database. For example, spectrum policy information that is stored in a database in the form of spectrum masks may be used to compute the maximum allowed transmit power of a commercial transmitter, such as a cellular base station. The information processor 286 may process for example spectrum occupancy and interference measurements to derive occupancy and interference statistics.

The cloud node 200 may also include a database synchronizer 285 to enable synchronization and/or sharing of information among databases at cloud nodes.

The cloud node 200 may also include radio resource manager 288. The radio resource manager 288 may include radio resource management algorithms executed based on spectrum occupancy information as well as spectrum access policy information queried from databases. The radio resource manager 288 may include a spectrum allocation engine to make decisions on assigning frequencies to calls based on information gathered from spectrum occupancy databases. The radio resource manager 288 may also include a spectrum allocation policy engine to enforce policies that influence decisions made by the Spectrum Allocation Engine. These policies may be derived from relevant regulatory policies, Tier-1 incumbent user policies on spectrum sharing, and Tier-2/Tier-3 user customized policies.

The cloud node 200 may also include Computing and Storage Resources modules 292 and 294. These modules 292/294 may integrate with Cloud Resource Provisioner 278 in order to compute computing and storage resources that are available via the cloud. Modules 292/294 may assign and schedule computing and/or storage resources to various computing operations involved in processing service requests.

Figure 3:
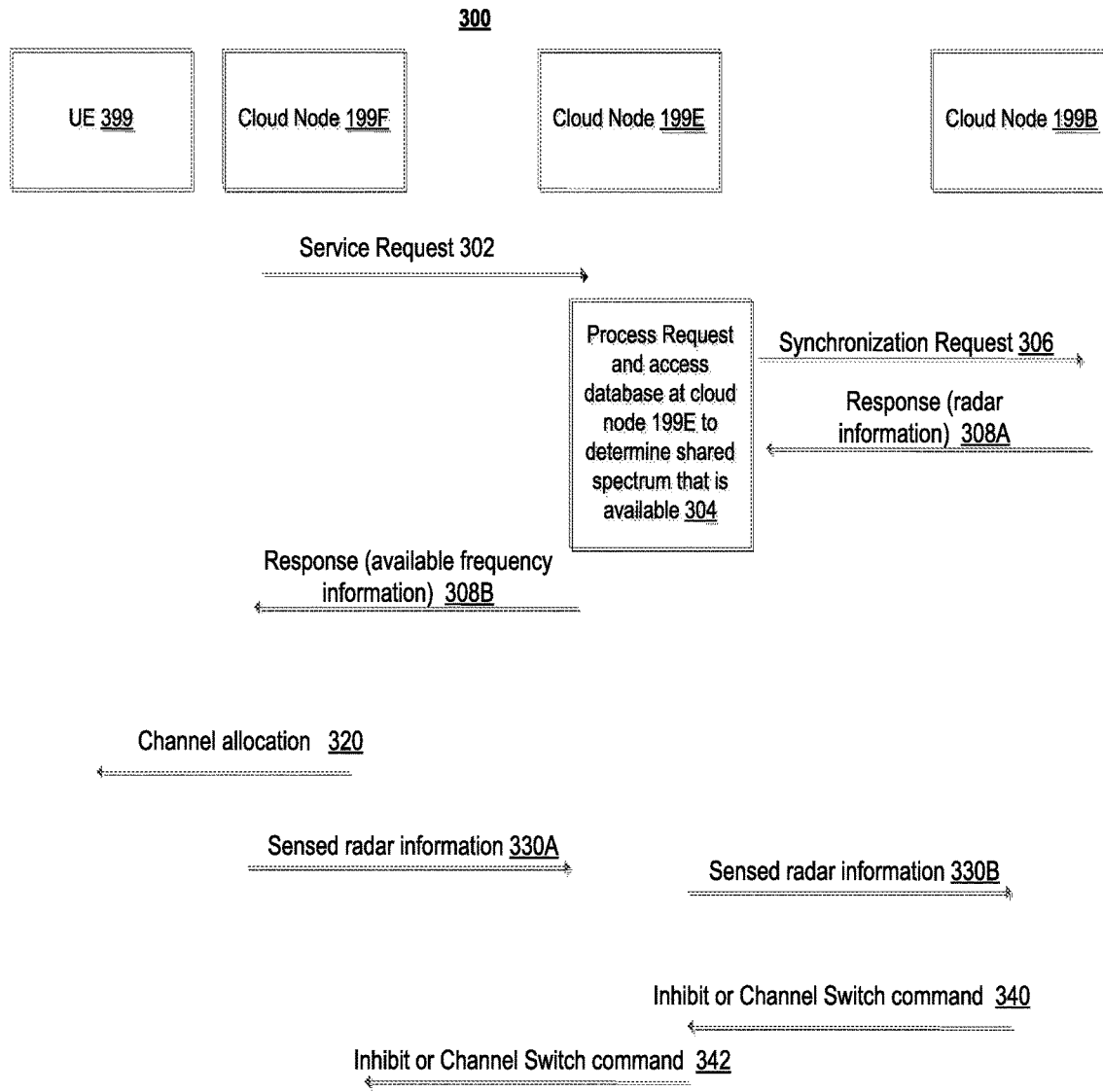
FIG. 3 depicts an example process for sharing co-existence spectrum information, in accordance with some example embodiments.

FIG. 3 depicts an example process 300 in accordance with some example embodiments. The description of FIG. 3 also refers to FIGS. 1 and 2.

At 302, a first cloud node may send a service request to a second cloud node, in accordance with some example embodiments. For example, cloud node 199F may send a service request for a frequency allocation in a co-existence portion of the spectrum, which may be used by other transmitters, such as radars.

When cloud node 199E receives the service request, cloud node 199E may process, at 304, the service request and access a database 284 at cloud node 199E to determine whether the shared spectrum is available. In some example embodiments, cloud node 199E may request, at 306, a database synchronization with cloud node 199B and, in response, provide, at 308A, radar information regarding shared frequencies, locations, and/or times that are available for use by commercial wireless.

At 308B, cloud node 199E may respond to cloud node 199F with available frequency information, in accordance with some example embodiments. This available frequency information enables cloud node 199F (which is at a base station) to provide, at 320, a channel allocation to a user equipment 399, in accordance with some example embodiments. This channel allocation may be carried by a radio resource control message.

In some example embodiments, sensors at the cloud nodes may use the radar information (for example, radar information at 308A-B and the like) to enable a sensor 270 at a cloud node to detect whether a portion of the co-existence spectrum is being used. For example, a sensor 270 at cloud node 199F may sense whether a commercial radio, such as a user equipment, base station, and/or the like, is operating on a channel allocated for co-existence between radars and commercial radios and their networks. In the example of FIG. 3, cloud node 199F may sense that a base station or other transceiver is transmitting on a portion of the spectrum which should be used by for example a radar. When this is the case, cloud node 199F may send, at 330A, to cloud node 199E, the sensed radar information indicating a possible interferer. This information may be forwarded at 330B to cloud node 199B. In response, cloud node 199B may turn off (or inhibit) use of that portion of the spectrum by commercial radios and/or networks by issuing a inhibit or turn off command at 340. This command may be forwarded at 342. The turn off or trigger command may indicate to second and third tier cloud nodes and their associated networks, such as base stations, wireless access points, and the like to stop using a portion of the spectrum associated with the possible infringer. Although the previous example illustrated an inhibit or turn off command being sent at 340 and 342, the command may also be a channel switch to move to a different portion of the spectrum as well.

As such, the sensors 270 at the cloud nodes may collect radar information (for example, radar main beam location, radar main beam frequency, and/or the like), and then upload that radar information to a cloud database 284 shared among one or more cloud nodes. Moreover, security 262 at the cloud nodes may control read, write, and access to the radar information. Furthermore, the cloud nodes (for example, Cloud Service Policy Engine 272) may be used to turn off radios and networks at the second or third tiers causing spontaneous interference to a radar. Moreover, this turn off may controlled by a cloud node at the first tier. In addition, the cloud nodes (for example, Cloud Service Policy Engine 272) may trigger a channel switch radios and networks at the second or third tiers, and the switch may be controlled by a cloud node at the first tier.

Figure 4:
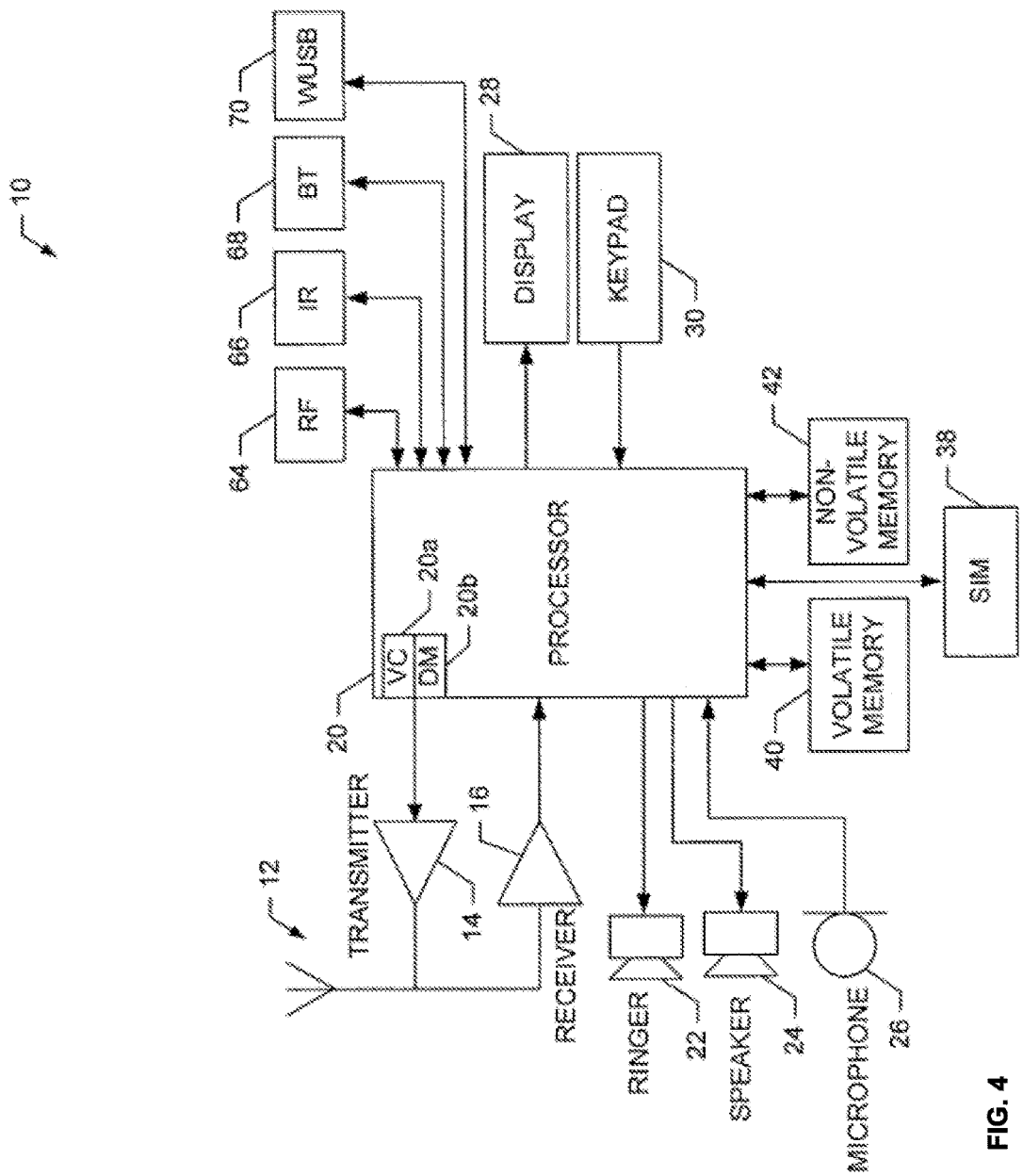
FIG. 4 depicts an example apparatus, in accordance with some example embodiments.

FIG. 4 illustrates a block diagram of an apparatus 10, in accordance with some example embodiments. Apparatus 10 may include a transmitter 14 and/or a receiver 16. Moreover, apparatus 10 may service as a base station, wireless access point, a user equipment (for example, a cell phone, a tablet, a smartphone, and the like) and/or any other radio, and apparatus 10 may be configured to include (or be coupled to) a cloud node, such as cloud node 200.

The apparatus 10 may, in some example embodiments, include at least one antenna 12 in communication with a transmitter 14 and a receiver 16. Alternatively transmit and receive antennas may be separate.

The apparatus 10 may, in some example embodiments, also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to perform one or more of the operations disclosed herein with respect to the host, accessory device, and/or extension device. The memories may comprise an identifier, such as an international mobile equipment identification (IMEI) code, capable of uniquely identifying apparatus 10. The functions may include one or more of the operations disclosed herein including the operations disclosed with respect to the cloud node as well as process 200. The memories may comprise an identifier, such as an international mobile equipment identification (IMEI) code, capable of uniquely identifying apparatus 10. In the example embodiment, the processor 20 may be configured using computer code stored at memory 40 and/or 42 to perform one or more of the operations disclosed herein with respect to process 200 and the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is lower latency sharing of co-existence spectrum information.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments may comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
   receiving, by a first cloud node and from a second cloud node, a service request to allocate a portion of a shared spectrum;
   synchronizing, by the first cloud node, local spectrum information collected by a sensor at the first cloud node with remote spectrum information at a central shared spectrum access database to form synchronized spectrum information, wherein the local spectrum information and the remote spectrum information include radar information and possible interferer information, and wherein the radar information includes at least one of a physical location of a radar, a location of the radar main beam, a frequency of a radar, or a rotation pattern of the radar;
   determining, by the first cloud node and in response to the service request, whether to allocate, to the second cloud node, a portion of the shared spectrum, the determining based on the synchronized spectrum information; and
   sending, by the first cloud node and in response to the determining, a command to the second cloud node to indicate an allowance to use the portion of the shared spectrum or to inhibit a use of the portion of the shared spectrum by at least a radar and a wireless user equipment.

2. The method of claim 1, wherein the command to inhibit the use of the portion of the shared spectrum includes a channel switch command to trigger a channel switch from the portion to another portion of the spectrum.

3. The method of claim 1, wherein the command to inhibit the use of the portion of the shared spectrum includes a turn off command causing one or more commercial radios to stop transmitting on the portion of the shared spectrum.

4. The method of claim 1, wherein the first cloud node is coupled to at least one of the central shared spectrum access database at a first tier or a licensed shared access controller at a second tier.

5. The method of claim 1, wherein a base station includes the sensor collecting the spectrum information.

6. The method of claim 1, wherein the central shared spectrum access database comprises an internet protocol cloud database.

7. The method of claim 1, wherein the first cloud node and the second cloud node share a common cloud database framework having a plurality of configurable functions.

8. The method of claim 7, wherein the configurable functions include at least one of a sensor, a service discoverer, a radio resource manager, a database synchronizer, a service request queue, a radio resource manager, a service registry, or a resource provisioner.

9. The method of claim 1, wherein a security interface, at the first cloud node, is configured to restrict access to the radar information by other cloud nodes.

10. The method of claim 1, wherein the possible interferer information includes at least one of a frequency of a radio transmitter, a location of a radio transmitter, or a time associated with a transmission at the frequency and the location.

11. An apparatus comprising:
    at least one processor; and
    at least one memory including computer program code, the at least one memory and the computer program code configured to, with the at least one processor, cause the apparatus to perform at least the following:
      receive, by the apparatus and from a cloud node, a service request to allocate a portion of a shared spectrum;
      synchronize, by the apparatus, local spectrum information collected by a sensor at the apparatus with remote spectrum information at a central shared spectrum access database to form synchronized spectrum information, wherein the local spectrum information and the remote spectrum information include radar information and possible interferer information, and wherein the radar information includes at least one of a physical location of a radar, a location of the radar main beam, a frequency of a radar, or a rotation pattern of the radar;
      determine, by the apparatus and in response to the service request, whether to allocate, to the cloud node, a portion of the shared spectrum, the determining based on the synchronized spectrum information; and
      send, by the apparatus and in response to the determining, a command to the cloud node to indicate an allowance to use the portion of the shared spectrum or to inhibit a use of the portion of the shared spectrum by at least a radar and a wireless user equipment.

12. The apparatus of claim 11, wherein the command to inhibit the use of the portion of the shared spectrum includes a channel switch command to trigger a channel switch from the portion to another portion of the spectrum.

13. The apparatus of claim 11, wherein the command to inhibit the use of the portion of the shared spectrum includes a turn off command causing one or more commercial radios to stop transmitting on the portion of the shared spectrum.

14. The apparatus of claim 11, wherein the apparatus is coupled to at least one of the central shared spectrum access database at a first tier or a licensed shared access controller at a second tier.

15. The apparatus of claim 11, wherein a base station includes the sensor collecting the spectrum information.

16. The apparatus of claim 11, wherein the central shared spectrum access database comprises an internet protocol cloud database.

17. The apparatus of claim 11, wherein the apparatus and the cloud node share a common cloud database framework having a plurality of configurable functions.

18. The apparatus of claim 17, wherein the configurable functions include at least one of a sensor, a service discoverer, a radio resource manager, a database synchronizer, a service request queue, a radio resource manager, a service registry, or a resource provisioner.

19. The apparatus of claim 11, wherein a security interface, at the apparatus, is configured to restrict access to the radar information by other cloud nodes.

20. The apparatus of claim 11, wherein the possible interferer information includes at least one of a frequency of a radio transmitter, a location of a radio transmitter, or a time associated with a transmission at the frequency and the location.

21. The method of claim 1, further comprising:
uploading, by the first cloud node, at least a portion of the local spectrum information to the central shared spectrum access database shared by at least the second cloud node.

* * * * *